May 15, 1928. 1,669,438
B. S. AIKMAN
CLUTCH CONTROL
Filed April 10, 1926    2 Sheets-Sheet 1

TO INTAKE MANIFOLD ABOVE THE THROTTLE

Inventor
Burton S. Aikman
By Brown, Boettcher & Dienner
Attys

Witness:

May 15, 1928. 1,669,438
B. S. AIKMAN
CLUTCH CONTROL
Filed April 10, 1926 2 Sheets-Sheet 2
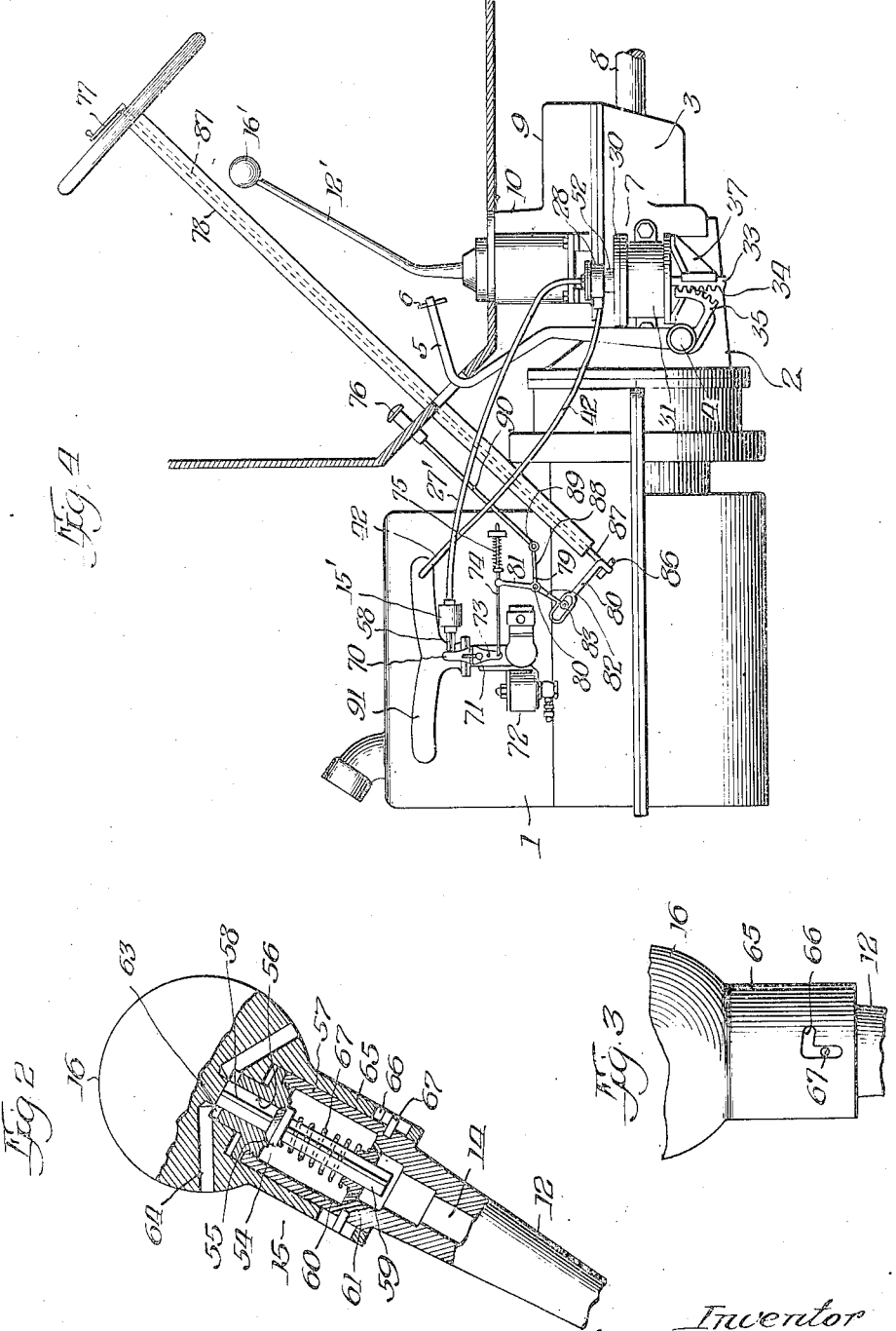
Inventor
Burton S Aikman Patented May 15, 1928.

1,669,438

UNITED STATES PATENT OFFICE.

BURTON S. AIKMAN, OF MILWAUKEE, WISCONSIN.

CLUTCH CONTROL.

Application filed April 10, 1926. Serial No. 101,101.

My invention relates to internal combustion power plants such as are now employed for driving motor vehicles, such as automobiles, trucks, and the like.

In operating a motor vehicle, particularly an automobile, one of the most difficult things to learn and to perform properly is the co-ordinated action between the clutch, the gear shift mechanism, and the throttle control of the carbureter. The clutch is thrown out for each operation of gear shifting and thrown in before the engine is accelerated to drive the car. While this becomes a matter of routine and almost automatic action on the part of the skillful operator, it is difficult for the beginner to grasp. Also, there are times when the skilled driver feels the burden of the inter-related cycle of operation, particularly when the cycle is interrupted or held in suspension at some intermediate part of the cycle. For example, it is common nowadays to control or direct automobile traffic with light or semaphore signals. The driver stops at the semaphore or light and waits for the "Go" signal. He can unclutch and shift his gears into neutral and again let in the clutch if he so desires. But that delays the starting of traffic. Generally, to save time, he shifts the gears into first gear and holds out the clutch. This puts him in a cramped or tiresome position.

According to the preferred form of my invention I employ a fluid pressure operated motor to throw out and hold out the clutch, and I provide a control for the same which is automatically governed conjointly with or by another controlling element such, for example, as the gear shift lever, the throttle control, or the brake. Preferably I use the suction of the engine as a source of fluid pressure, although pressure above atmospheric might be used as, for example, where a source of compressed air is available as, for example, a small compressor run from the engine as is often employed in vehicles where air brakes are employed or where a pressure gasoline system is used. Hydraulic pressure as from an oil pump driven by the engine may be employed.

I prefer, in the forms of the invention herein illustrated, to employ the suction of the engine because it fits in peculiarly with the operation of the automobile. According to the preferred embodiment of my invention, I provide a suction operated motor element for throwing out and holding out the clutch. Then I provide a control valve so related to the throttle lever of the carbureter that when the throttle is moved from closed position to accelerate the engine the clutch is shortly thereafter, or substantially simultaneously, let in. The action of opening the throttle has a differential effect in that first, it reduces the suction in the intake and hence the pressure acting upon the motor element and, second, such movement of the throttle or accelerator actuates the pilot or control valve for the suction operated motor element to vent the same to atmosphere.

I have found that this arrangement gives an automatic control which is highly desirable and which fulfills all standard requirements of operation of the vehicle.

In a modified form of my invention, I dispose the pilot control valve upon or in the handle of the gear shift lever so that when the hand of the operator rests upon the knob of the gear shift lever the pilot valve is actuated for causing the motor to throw out the clutch. By a pin and bayonet slot or a cam, or the like, the knob may act when turned to hold the valve open, so that the operator may thereby leave the clutch out and the gears in mesh with the engine running. By merely turning the knob the clutch may be let in.

While I have illustrated the conjoint control of the gear shift lever and the control valve for the throw out motor, and the conjoint action of the accelerator or throttle valve mechanism and the control valve of the throw out motor, it is to be understood that the actuation of the clutch control may be coordinated with another control as, for example, the brake mechanism, without departing from the spirit or scope of the invention.

Now, in order to acquaint those skilled in the art with the manner of constructing and operating a device embodying my invention, I shall describe in connection with the accompanying drawings a specific embodiment of the same.

In the accompanying drawings:—

Fig. 2 is an enlarged sectional view showing the control valve disposed in the knob or handle of the gear shift lever;

Fig. 3 is a fragmentary side elevational view of the same showing the bayonet slot for holding the valve open; and Fig. 4 is a side elevational view of an embodiment of the invention in which the control of the clutch operating motor is put upon the same elements that control the throttle valve of the carbureter.

Figure 1:
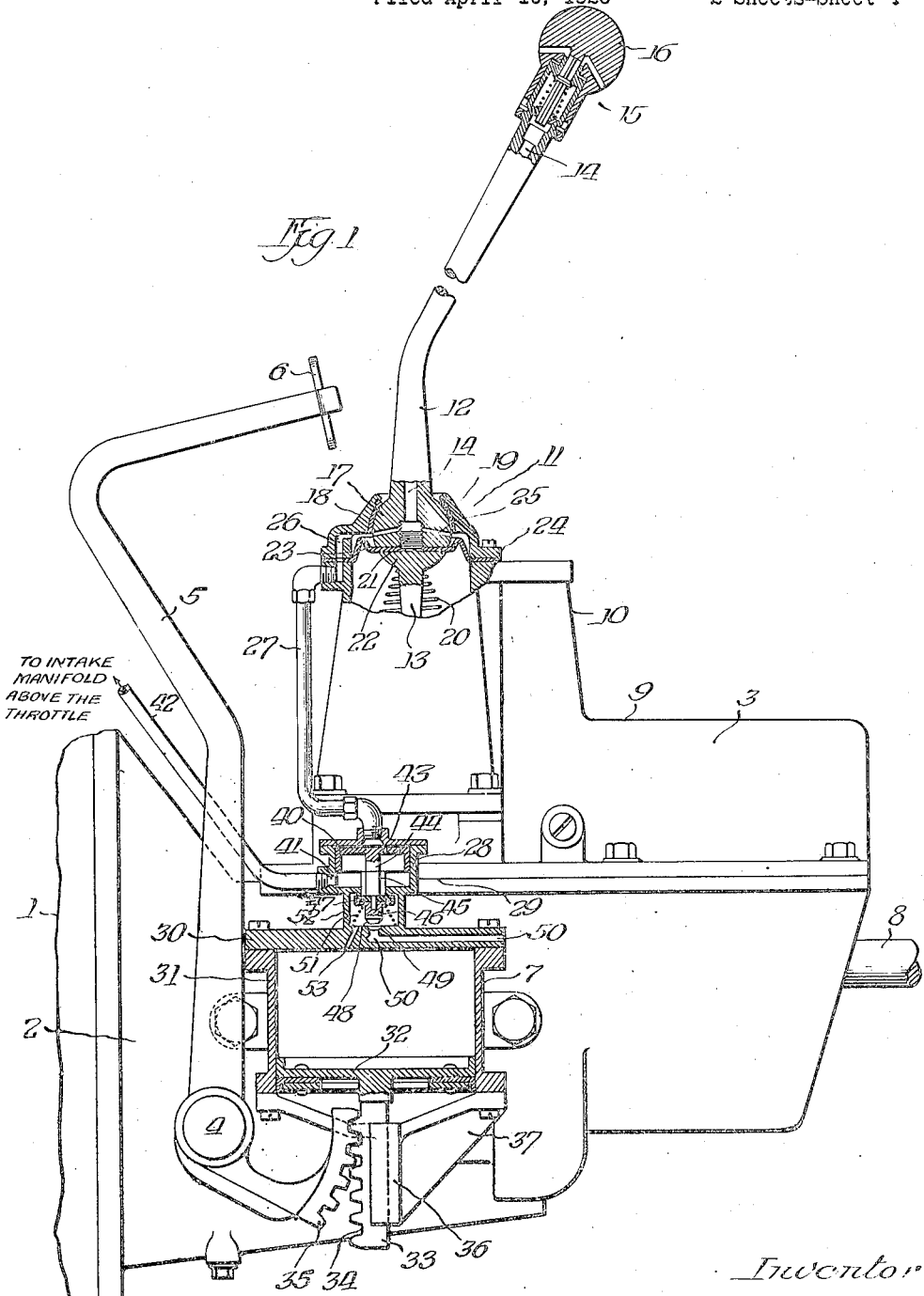
Figure 1 is a side elevational view partly in section showing an embodiment of my invention in which the control of the clutch operating motor is made to depend upon the controlling element of the gear change mechanism.

Referring now to Figs. 1 and 3, the engine 1, which is only partly indicated, has the usual crank shaft connected through a disc clutch (not shown), but disposed in the bell housing 2, to the driving gears in the gear case 3.

The clutch may be of any preferred type as, for example, a multiple disc clutch, and since no novelty is claimed in the clutch per se, I have not illustrated the same. The clutch is, however, controlled by the rock shaft 4 which has the clutch lever 5 bearing the pedal 6 connected thereto. The clutch, as is common in devices of this kind, is automatically thrown into engagement by a spring (not shown) and is adapted to be held out of engagement against the tension of the spring either by depressing the pedal 6 or, as will be disclosed later, by the operation of the fluid pressure operated motor 7.

The transmission or change gear mechanism 3 may be of any preferred form. It contains the usual accelerating and reverse gears for connecting the drive shaft and the engine to the driven or propeller shaft 8 in the well known manner through reduction gears, direct drive, or reverse. This sliding gear transmission 3 has a gear case 9 provided with a hollow projection or extension 10, in the upper end of which there is mounted, through the medium of the universal joint 11, a gear shift lever 12. The lower end 13 of the gear shift lever 12 below the universal joint 11 is of standard or any preferred construction but the upper end of the gear shift lever 12 in the present structure is tubular to provide a passageway 14 leading up to a valve 15 disposed within the knob or handle 16. The valve need not be mounted in the knob. It might be mounted anywhere on the lever 12 so long as it is operated by depression or elevation of the knob, as thru a rod or stem connected to the knob.

The universal joint 11 is formed by providing a spherical surface 17 upon the lower end of the lever section 12, and this spherical enlargement engages in a spherical seat formed in a cap member 18 provided with a packing 19 for maintaining a fluid tight joint. A spring 20 holds the spherical enlargement 17 in engagement with the packing 19. The lower section 13 of the gear shift lever is provided with a stud 21 which threads into a threaded recess in the enlargement 17, and it has a flange 22 which clamps the diaphragm 23 against the lower part of said enlargement 17.

This diaphragm 23 is flexible to permit the universal motion of the lever about the universal joint 7. The outer edges of the diaphragm 23 are clamped under the flanges 24 of the cover member 18.

One or more radial passageways 25 extend from the bore 14 to the space between the cap 18 and the diaphragm 23, and a passageway 26 is formed in the cover member 18 to communicate with said space. The passageway 26 is extended down into a part of the upward extension 10 of the gear case 9 to provide a threaded socket connection for the pipe 27, which in turn leads down to the operating cylinder 28 of the relay valve mechanism 29.

The relay valve mechanism 29 is mounted on the cylinder head 30 of the operating motor 7, which motor actuates the clutch. The motor 7 has a cylinder or working chamber 31 with a piston 32, shown as a sliding piston, although it is to be understood that a diaphragm might be employed instead. This piston 32 is guided in the cylinder and is drawn upwardly when suction is imposed upon the working chamber. The piston 32 has a rod or stem 33 bearing a rack 34 which rack meshes with a gear sector 35. The gear sector 35 in turn is fixed to the rock shaft 4, being either a continuation of the clutch pedal lever 5, or being a separate piece, keyed, pinned, or otherwise secured to the rock shaft 4. A suitable guide 36 supported by brackets 37 holds the stem 33 in position to maintain mesh between the rack and the gear sector. The motor element need not be mounted in the specific position shown, nor need the rack and gear sector be employed. Any suitable mounting and connection may be employed to operate the clutch.

The relay valve 29 has the operating cylinder 28 containing an operating piston 40. This piston is shown as a sliding piston, but it will be understood by those skilled in the art that a diaphragm might be employed instead. The cylinder 28 has a connection at its lower end formed by passageway 41 and leading to pipe 42 through the intake manifold of the engine above the throttle control valve therefor.

The piston 40 has a bleed opening 43 therethrough so that there is a small, constantly open passageway between the space above the piston and the space below the piston for a purpose which will later be described in connection with the operation of the device. The piston 40 has a stem 44 provided with the guiding wings 45 leading down through a valve opening in the bottom wall of the cylinder 28. The opening through which the stem 44 projects has a depending flange forming a valve seat, and the stem 44 has a compound valve member 46 secured thereto. This compound valve 46 has a yielding face 47 at its upper side adjacent the wings 45 for co-operating with the valve seat formed about the opening through the bottom of the cylinder 28. The compound valve 46 also has a valve face in the form of a conical metal valve 48 at its lower end, and this conical plug valve co-operates with a seat 49 formed about the port 50 in the top wall of the cylinder head 30. The compound valve and its connected piston 40 are held in raised position normally by means of the spring 51. The compound valve 46 is enclosed in a housing 52 which is formed in the shape of a hollow cylindrical boss integral with the head 30 and the bottom cylinder 28. A passageway 53 connects the interior of the cylinder 31 of the operating motor 7 with the interior of the valve housing 52.

The control valve which is mounted in the knob 16 comprises a conical faced poppet valve 54. This valve 54 co-operates with a conical seat 55 formed at the lower end of a passageway 56 formed in the housing 57 which housing is an extension of the tubular lever 12. The valve 54 has a grooved stem 58 extending above the valve through the opening 56 so that the valve is guided thereby. The valve 54 also has a stem 59 below the same, this stem being likewise grooved and guided in a web 60 disposed in the lower part of the casing 57. One or more passageways 61 provide communication between the bore 14 of the lever 12 and the interior of the chamber 57. A coiled spring 62 holds the valve 54 against its seat and this spring is of sufficient strength to keep the valve closed against the force of suction which is imposed upon the same by the operation of the motor.

The knob 16 has a recess 63, the bottom of which is adapted to engage the upper end of the valve stem 58. This recess communicates with atmosphere through one or more ports or passageways 64, these passageways being so disposed that they are not readily blocked by the hand of the operator. The knob 16 has a tubular extension 65 fitting over the chamber 57 and guided thereupon. A series of angular or bayonet slots 66 are formed in the tubular extension and pins 67 are secured in the bottom of the chamber 57 and lie in the slots 66. It will be apparent that when the knob 16 is depressed, the valve 54 will be opened and the chamber 57 connected to atmosphere, and since this chamber 57 communicates with a bore 14, atmospheric pressure will extend down through the bore 14, radial passageways 25, passageways 26, pipes 27, down to the motor cylinder of the relay valve 29.

The operation of the device above described is as follows:—

Assume that the gear shift lever 12 is in neutral position and that the clutch is in clutching position, as shown in Figure 1. The engine may be started in the usual manner and caused to idle. The throttle valve of the engine being now closed, the suction in the intake manifold is high. This suction extends through the pipe 42 to the interior of the relay valve motor cylinder 28 below the piston 40. The compound valve 46 has its valve face 47 against the valve seat in the bottom of the cylinder 28, and the valve 48 is opened permitting atmosphere to enter the valve housing 52 through the passageway 50 and to extend to the interior of the operating cylinder 31 through the passageway 53.

It will be noted that the small passageway 43 through the piston 40 permits the air to be withdrawn from below the control valve 54 in the knob 16, with the result that the parts will stand in the position shown in Figure 1.

If, now, the operator desires to shift into gear, he places his hand upon the knob 16 thereby automatically opening the valve 54 to permit atmosphere to pass in through the passageway 64, down past the valve 54 into the chamber 57, through the port or passageway 61, down the passageway 14, radial passageways 25, passageway 26, pipe 27, to the top of the piston 40. Such inrush of atmospheric pressure is in excess of the capacity of the small bleeder port 43 with the result that the difference in pressure between atmospheric and suction upon the piston 40 forces the compound valve 46 downwardly, closing off the port 49 and opening the passageway between the interior of the cylinder 28 and cylinder 31 so that the suction from the intake manifold to the engine is able to exhaust the interior of the cylinder 31 through the passageway 53, the valve port controlled by the valve 47, passageway 41, and pipe 42 to the intake manifold. The piston 32 of the pneumatic motor 7 rises drawing with it the stem 33, and through the operation of the rack and quadrant this actuates the clutch operating shaft 4 to throw out the clutch. The above described operation occurs very quickly, so quickly in fact as not to interfere with the continued movement of the gear shift lever to the desired position for meshing the gears in the transmission 3. When the gears are in proper mesh the operator removes the weight of his hand from the knob 16, permitting the valve 54 to be closed by the spring 62, with the result that the pressure above the piston 40 is quickly equalized through the restricted passageway 43, the valve 48 is opened and valve 47 closed, and the clutch is quickly let in to connect the engine with the propeller shaft 8.

The engine is accelerated by operation of the throttle valve in the intake passageway, as is well understood by those skilled in the art. Subsequent operations of shifting into second gear and in direct drive follow the procedure above described.

Since the operation of the clutch is automatic, the lever 5 and pedal 6 may be completely omitted.

The speed with which the clutch is let in may be controlled by the size of the ports and passageways to secure any desired mode of operation. Preferably the engine is started to accelerate as the clutch is let in.

If the clutch pedal 6 and lever 5 are omitted, the controls of the vehicle may be reorganized to put the brake pedal under the control of the left foot and the accelerator under the control of the right foot, so that the feet of the operator may not be required at any time to shift their position. A second pedal between the brake pedal and the accelerator may operate a throwout for the clutch and a ratchet brake for parking. Such a combined clutch and brake pedal is now supplied on the Reo automobile.

In the form shown in Figure 4, I have put the control of the valve 15 under the throttle control of the engine.

In this construction the pneumatic motor 7 for actuating the clutch control shaft 4, its compound control valve 46 with operating piston 40 in the cylinder 28, is in all respects the same as described in connection with the embodiment of Figs. 1 to 3, inclusive. The connected pipe 27' in the present case, like the suction pipe 27, leads to the control valve in this case 15', which in all operating respects is like the valve 15 shown in detail in Fig. 2 with the exception that the stem 58 instead of being under the control of the knob 16 is under the control of a lever 70 secured to the throttle shaft 71 of the carbureter 72. This lever 70 is an extension of the usual throttle operating lever 73 or it may be a separate lever if so desired secured to the throttle shaft 71. The lever 73 is connected to an operating rod 74 which is normally urged to the left by the spring 75. To this rod 74 there are connected in any suitable manner the usual accelerating pedal 76 and hand throttle lever 77 mounted on the steering column 78. The particular means which I have shown in Fig. 4 comprises a three arm bell crank lever 79 pivoted at 80 and having one arm 81 connected to the rod 74 leading to the lever 73 of the carbureter throttle. Another arm 82 is connected by a pin and slot 83 through a link 84, which link in turn is connected to a lever 86 mounted on the lower end of a shaft 87. This shaft extends through the steering column 78 and has the hand control lever 77 at its upper end. The third arm 88 of the bell crank lever 79 is connected by a pin and slot connection 89 to the shaft 90, which forms an extension of the accelerator pedal 76. The stem 58 of the control valve 59 is engaged by the lever 70 when the throttle of the carbureter 72 is in closed position, the spring 75 serving to close the throttle when the foot is removed from the accelerator pedal 76 and the throttle lever 77 is in a zero position. Thus, whenever the throttle is in closed position and the engine is idling, the clutch is thrown out by the pneumatic motor 7.

The operation of the form described in Fig. 4 is as follows:—

Assume that the parts are in the condition shown and that the engine is started, the suction in the intake manifold 91 being communicated through port 42 to the interior of the cylinder 28 below the piston 40 pulls down the piston 40, since the air entering through the valve 15' being unable to satisfy the suction within the cylinder 28 because of the restricted port 43 opens the valve 47 and closes the valve 48 permitting suction through the passageway 53 to act upon the piston 32 of the pneumatic motor 7. As a result, the clutch is promptly thrown out. The gear shift lever 12' and the transmission 3 are of standard construction and are in no way altered. The change gears in the transmission 3 may now be operated to any desired position and upon stepping on the accelerator pedal 76 the lever 70 moves away from the stem 58 letting the valve 15' close, cutting off the atmospheric connection above the piston 40 in the cylinder 28, so that the suction pressure above and below the piston 40 quickly equalizes and permits the spring 51 to shift the compound valve 46 to close its valve 47 and open its valve 48. As a result, the clutch spring throws in the clutch, the piston 32 being moved downwardly, and thus as fuel is fed to the engine by opening the throttle the clutch is let in. The operation is so far automatic that merely releasing the pressure from the accelerator pedal 76 immediately throws out the clutch and, if the brake is not applied, the vehicle may coast freely. If the vehicle is standing still and it is desired to accelerate through the transmission or reverse the motion of the car, shifting of the gears may readily be accomplished, since the clutch is thrown out as soon as the throttle is closed. Preferably there is just enough lag in letting in the clutch to permit the engine to accelerate slightly as the clutch takes hold.

I have operated a device such as disclosed in Figure 4 using, however, a diaphragm motor instead of the piston motor 7 for operating the rock shaft 4 of the clutch, and I find that the disposal of the control of the clutch under the throttle operating mechanism fulfills all of the requirements of driving and operation of the vehicle.

In order to ease the operation of starting the engine when the grease in the gear box is cold, a transmission employing clutches instead of sliding gears may be used so that none of the gears are in action unless the drive proceeds through the gear box. This, however, is optional.

In this form of the invention I preferably place the service brake pedal under the left foot and the accelerator under the right foot. Between these I provide a pedal connected to the clutch and to a parking brake. The movement of this intermediate pedal first throws out the clutch. Further movement then applies a parking brake having a pawl and ratchet to permit the car to be left with the clutch out and the parking brake set. The pawl is preferably under the control of the service brake pedal so that upon the operator pressing the service brake pedal the parking brake is released and the clutch let in if not held out by the suction motor. This permits clearing of the front compartment of the parking brake and it permits holding of the clutch out when the engine is cranked, and it provides also a brake for each foot in case of emergency braking or otherwise heavy braking with both brakes.

I do not intend to be limited to the details shown or described.

I claim:—

1. In combination, a vehicle having an internal combustion engine, a gear set having a control device, said engine having a clutch, a motor operated by fluid pressure difference for operating said clutch, a control valve for the motor, said control valve being operated by the actuation of said control device, and means for locking the valve in actuated position independently of the position of the control device.

2. In combination, an engine having an intake pipe, a throttle therefor, a clutch for the engine, a vacuum operated motor connected to the intake pipe for throwing out the clutch, a control valve for said motor, and manual means for operating the throttle and actuating said valve to control the motor to let in the clutch.

3. In combination, a clutch, a suction operated motor for operating the clutch, a reversible piston valve structure for connecting the pneumatic motor to suction or to atmosphere, a movable motor member for operating said reversible valve, a normally closed control valve adapted to be actuated to admit atmosphere upon one side of said movable motor element, said movable motor element having a bleed port leading to said last named valve.

4. In combination, an internal combustion engine having a clutch, a change speed transmission in series relation to the clutch, a pneumatic motor element for operating the clutch, a relay valve controlling said motor element, and a control valve for the relay valve, said control valve being disposed on the gear shift lever of the transmission.

5. In combination, an engine having a clutch and a change speed gear transmission in series therewith, a gear shift lever for said transmission, a control valve mounted on said gear shift lever and operable by the hand of the operator, a pneumatic motor element for throwing out the clutch controlled by said control valve, and means on the gear shift lever for locking the control valve open.

6. In combination, in a motor vehicle, a driving engine, a gear set having a control device, a clutch between the engine and the gear set, said engine having means for establishing a fluid pressure difference, a motor operated by fluid pressure difference for operating said clutch, a valve controlling the application of fluid pressure difference to said motor, and means for jointly actuating said control device and said valve.

7. In combination, a transmission having an operating lever, a knob member movably mounted on the upper end of said lever, and a valve operable by movement of said knob.

8. In combination, a transmission operating lever, a knob member mounted for limited longitudinal and rotary movement on said lever, a valve adapted to be actuated by longitudinal movement of said knob, and cam means actuated by rotary movement of the knob for locking the valve in operated position.

9. In combination, an engine having a clutch and a transmission in series relation therewith, an operating lever for the transmission having a movable knob on the upper end thereof, a pneumatic motor for throwing out the clutch, a relay valve governing the operation of the pneumatic motor, a control valve for said relay valve, said control valve being operable by the movable knob on the lever.

In witness whereof, I hereunto subscribe my name this 8th day of April, 1926.

BURTON S. AIKMAN.